(12) United States Patent
Shen

(10) Patent No.: US 10,149,568 B2
(45) Date of Patent: Dec. 11, 2018

(54) FILTER POSITIONING STRUCTURE FOR BEVERAGE INFUSER

(71) Applicant: Tzu Yuan Shen, Nantou County (TW)

(72) Inventor: Tzu Yuan Shen, Nantou County (TW)

( * ) Notice: Subject to any disclaimer, the term of this patent is extended or adjusted under 35 U.S.C. 154(b) by 634 days.

(21) Appl. No.: 14/818,472

(22) Filed: Aug. 5, 2015

(65) Prior Publication Data

US 2016/0120355 A1    May 5, 2016

(30) Foreign Application Priority Data

Nov. 4, 2014   (TW) .............................. 103219539 A

(51) Int. Cl.
*A47J 31/06* (2006.01)

(52) U.S. Cl.
CPC ....... *A47J 31/0626* (2013.01); *A47J 31/0636* (2013.01)

(58) Field of Classification Search
CPC .................................................. A47J 31/0626
USPC ........................................................... 99/322
See application file for complete search history.

(56) References Cited

U.S. PATENT DOCUMENTS

| 7,779,751 B2 * | 8/2010 | Gilbert | A47J 31/20 99/284 |
| 8,307,755 B2 * | 11/2012 | Shen | A47J 31/20 220/501 |

* cited by examiner

*Primary Examiner* — Ibrahime A Abraham
*Assistant Examiner* — Spencer h Kirkwood
(74) *Attorney, Agent, or Firm* — Rosenberg, Klein & Lee

(57) ABSTRACT

The present disclosure illustrates a filter positioning structure for a beverage infuser. In the filter positioning structure, a casing member includes upper and lower engaging parts respectively connected with top and bottom ends of a connecting part. A filter can be combined with the lower engaging part. The upper engaging part is ring-shaped and has protruding parts on an outer periphery thereof. Therefore, the filter positioning structure can be positioned in the beverage infuser by blocking between the protruding parts and a stop part of a body of the beverage infuser.

5 Claims, 9 Drawing Sheets

FILTER POSITIONING STRUCTURE FOR BEVERAGE INFUSER

BACKGROUND OF THE INVENTION

1. Field of the Invention

The present disclosure relates to a beverage infuser, more particularly to a filter positioning structure for the beverage infuser.

2. Description of the Related Art

Please refer to FIG. 8 and FIG. 9 which respectively show a conventional beverage infuser including a body 91 and a cover 92. The body 91 has a chamber 93 inside, and the cover 92 is disposed at an opening 931 of the chamber 93 for covering the body 91. The cover 92 is connected with a sucking pipe 94 and a filter 95 inside the chamber 93. An infusion object, such as tealeaves, can be placed in the filter 95, and the chamber 93 can be filled with infusion liquid. After the tealeaves in the filter 95 are soaked in the infusion liquid for a period, the user can drink the beverage in the infuser through the sucking pipe 94.

For engagement of the filter 95 and the cover 92, the cover 92 is formed with a cylinder 96 at a bottom thereof and extended into the chamber 93, the cylinder 96 is formed with a stop part 961 at a bottom thereof, the filter 95 is formed with a bar 97 extended upwardly and corresponding to the cylinder 96, and the bar 97 is formed with a cavity 971 at a top end thereof. The cavity 971 has two hollow sides (not shown in Figs), the stop part 961 can be inserted into the cavity 971 through one of the two hollow sides and blocked by a hook part 972 at the top of the cavity 971 for temporary positioning in the cavity 971. However, the engagement structure of the filter 95 and the cover 92 has the following problems.

1. The cylinder 96 is temporarily positioned in the cavity 971 of the bar 97 by blocking between the hook part 972 and the stop part 961 of the cylinder 96; however, but if the engagement between the blocking part 961 and the hook part 972 is too tight, the blocking part 961 is easy to be locked by the hook part 972 and difficult to be took off from the cavity 971, so the user cannot separate the filter 95 from the cover 92 easily.

2. If the engagement between the blocking part 961 and the hook part 972 is too loose, the filter 95 is just hung by the blocking part 961 but the blocking part 961 is not reliably restricted by the hook part 972 and, at this time, when the user separates the cover 92 and the filter 95 both from the body 91, the filter 95 is easy to touch an inside wall 911 of the body 91 during separation and then make the blocking part 961 escape from the cavity 971, so the filter 95 may be separated from the cover 92 before removed from the body 91.

3. Following the condition described above, under a condition that the cover 92 is connected with the body 91, when there is no infusion in the body 91 or a surface of the infusion is below the filter 95, if the body 91 is shaken, the filter 95 in the body 91 may sometimes collide the inside wall 911 of the body 91 to cause problems of noise and wearing because of the over-loose engagement between the blocking part 961 and the hook part 972.

Therefore, how to solve the problems caused by the filter positioning structure of the conventional beverage infuser becomes an important issue.

SUMMARY OF THE INVENTION

In order to solve the problems, an objective of the present disclosure is to provide a filter positioning structure of a beverage infuser in which a casing member combined with a filter can be firmly positioned at the opening of the body of the beverage infuser and easily took off from the opening of the body.

Another objective of the present disclosure is that when the cover is provided with a sucking pipe, the sucking pipe can pass through the casing member via the space formed by a structure of the casing member, so as to smoothly insert into the chamber of the body. Therefore, the casing member does not affect the insertion of the sucking pipe into the chamber.

In order to achieve the objectives, the present disclosure is to provide a beverage infuser having a body formed with a chamber and an opening at a top thereof. The opening is in communication with the chamber. The body is formed with a stop part at the opening, and a cover is disposed at the opening to close the body. A filter combined with a filter positioning structure can be positioned in the chamber. The filter positioning structure is a casing member including an upper engaging part, a connecting part and a lower engaging part. The upper and lower engaging parts are respectively connected top and bottom ends of the connecting part. The filter is combined with the lower engaging part. The upper engaging part is ring-shaped and has protruding parts at an outer periphery thereof, and positioned at the stop part by the protruding parts thereof.

The connecting part is column-shaped and has a bottom end directly connected with a central part of the lower engaging part. The upper engaging part has a hollow bottom, and the top end of the connecting part is located at a central portion of the hollow bottom of the upper engaging part and connected with the upper engaging part by only one side thereof via a bridging part. A hole is formed by a hollow part of the hollow bottom of the upper engaging part other than the bridging part. The hole is C-shaped in horizontal direction. An outer diameter of the connecting part is smaller than outer diameters of the upper and lower engaging parts, a longitudinal space shrunk inwardly is formed between the upper and lower engaging parts. In the chamber, the lower engaging part is spaced apart from the inside wall of the body by a distance to form a channel, and the longitudinal space, the hole and the channel are in communication with each other in longitudinal direction.

The stop part of the body is formed by the inside wall of the opening with the diameter gradually shrunk from top to down. The upper engaging part has a plurality of protruding parts located on the outer periphery thereof and arranged annularly. An outer diameter of the protruding parts formed at the most protruding parts in lateral direction is ranged between the maximum diameter and minimum diameter of the opening. By the plurality of protruding parts, the upper engaging part can be positioned at the inside wall of the opening of the body.

Preferably, each of the protruding parts has a protruding thickness thinned from top to bottom at the outer periphery of the upper engaging part.

Preferably, the casing member has a one-piece structure.

Preferably, the column-shaped connecting part includes plates staggered horizontally and longitudinally, and the bridging part has ribs located at top and bottom sides thereof for connecting with the upper engaging part.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
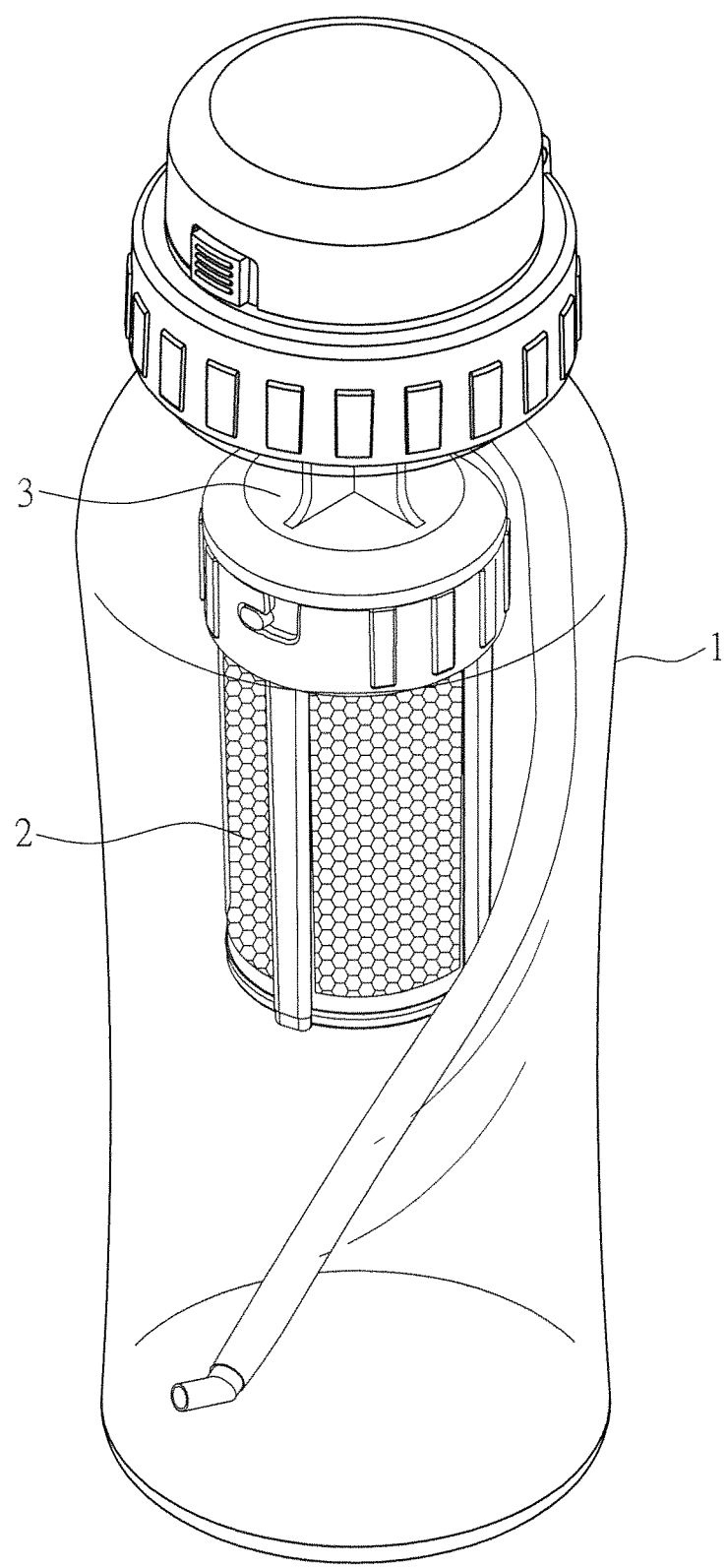
FIG. 1 is an elevational view of the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Please refer to FIG. 1 through FIG. 7 which respectively show a structure of an embodiment of the present disclosure for an exemplary purpose, but the present disclosure is not limited thereto.

Figure 2:
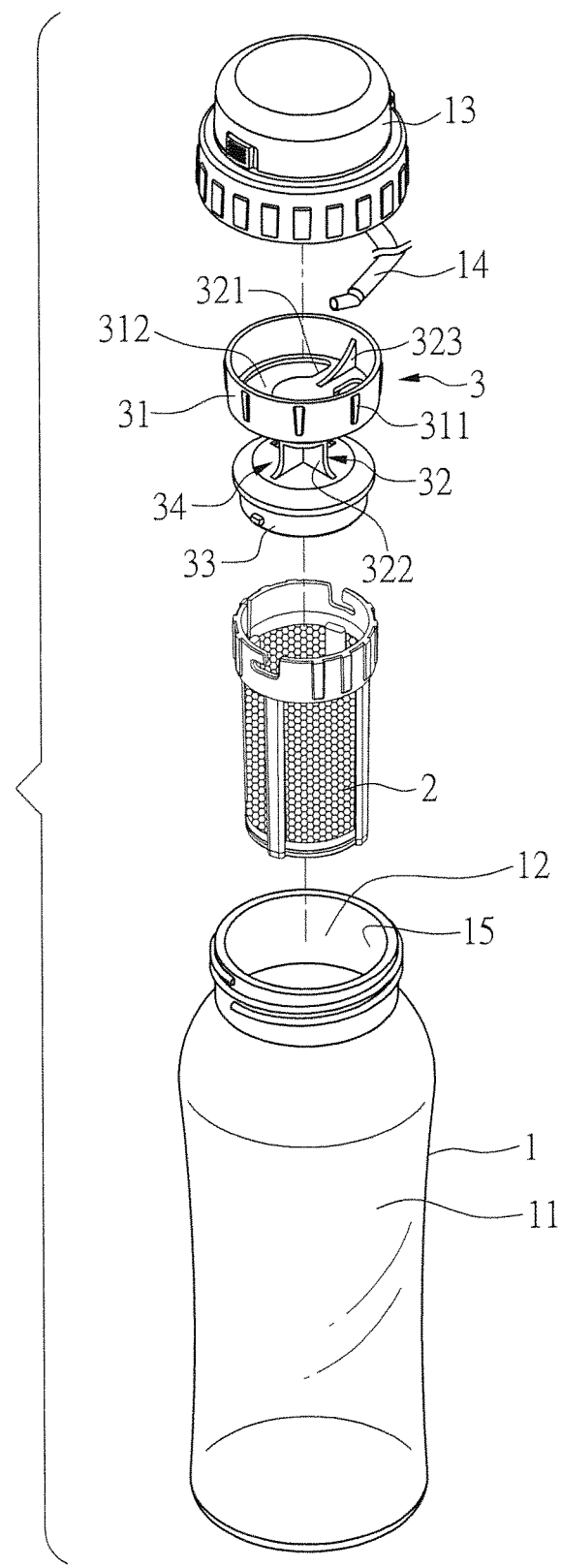
FIG. 2 is an exploded view of the present disclosure.
Figure 3:
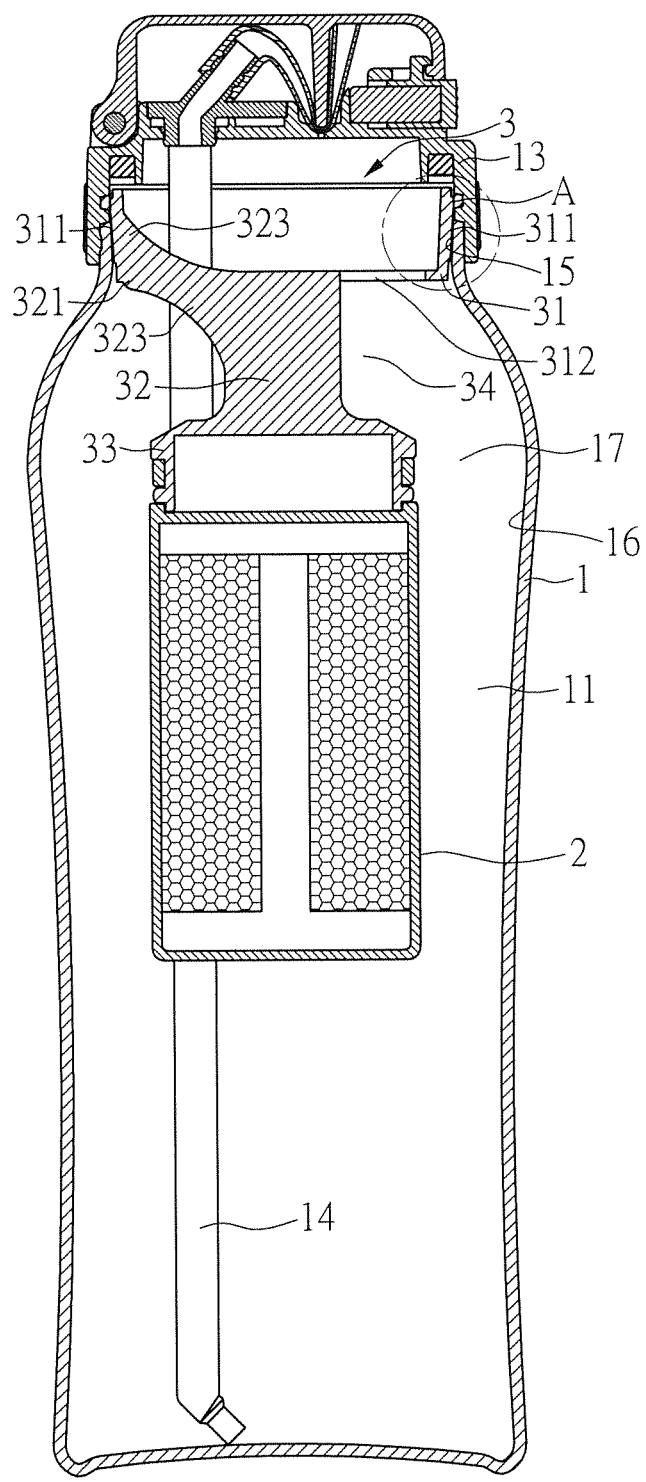
FIG. 3 is a sectional view of the present disclosure.
Figure 4:
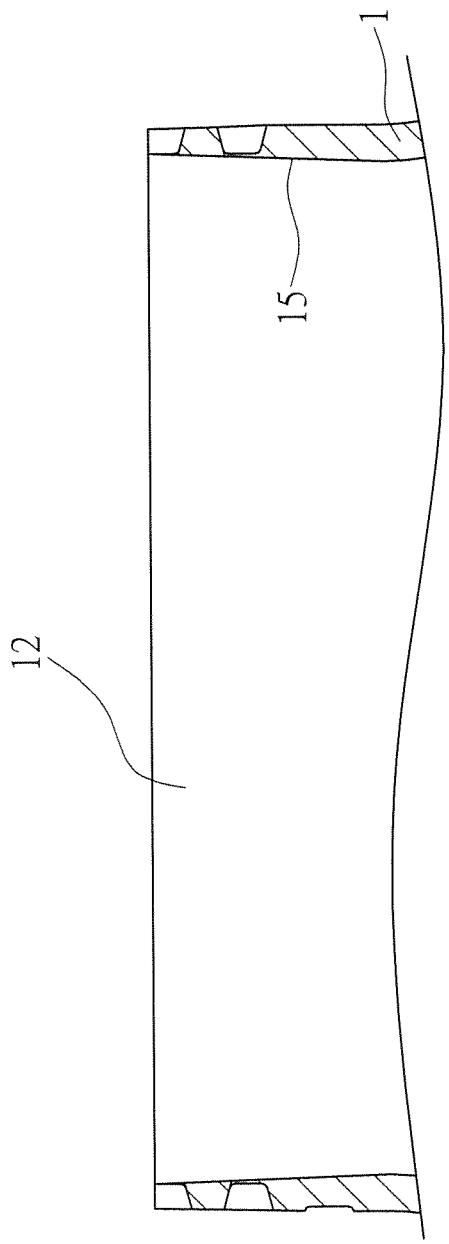
FIG. 4 is a structural view of a diameter of a body at an opening shrunk from top to bottom, in accordance with the present disclosure.

This embodiment provides a filter positioning structure for a beverage infuser, as shown in FIG. 1 through FIG. 3, and in the embodiment a water bottle is taken as an example for the beverage infuser. A body 1 of the water bottle has a chamber 11 and an opening formed at a top thereof. The opening 12 is in communication with the chamber 11. The body 1 is provided with a stop part at the opening 12, and a cover 13 to cover the opening 12 of the body 1. The filter 2 is combined with the filter positioning structure to be positioned in the chamber 11. In this embodiment, a sucking pipe 14 is disposed at a bottom of the cover 13 and extended to a bottom of the chamber 11. As shown in FIG. 4, the stop part of this embodiment is formed by an inside wall 15 of the opening 12 having a diameter shrunk from top to bottom.

Figure 5:
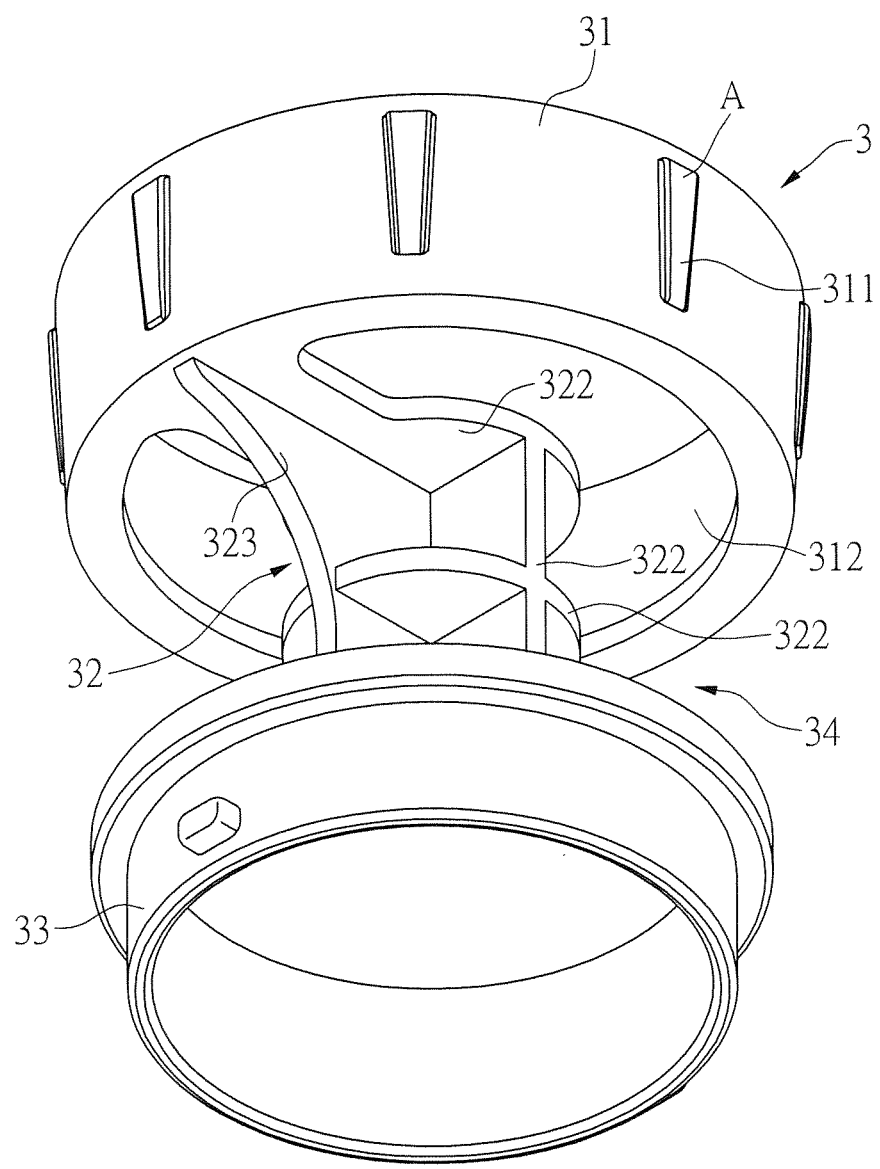
FIG. 5 is an elevational view of a casing member of the present disclosure.
Figure 6:
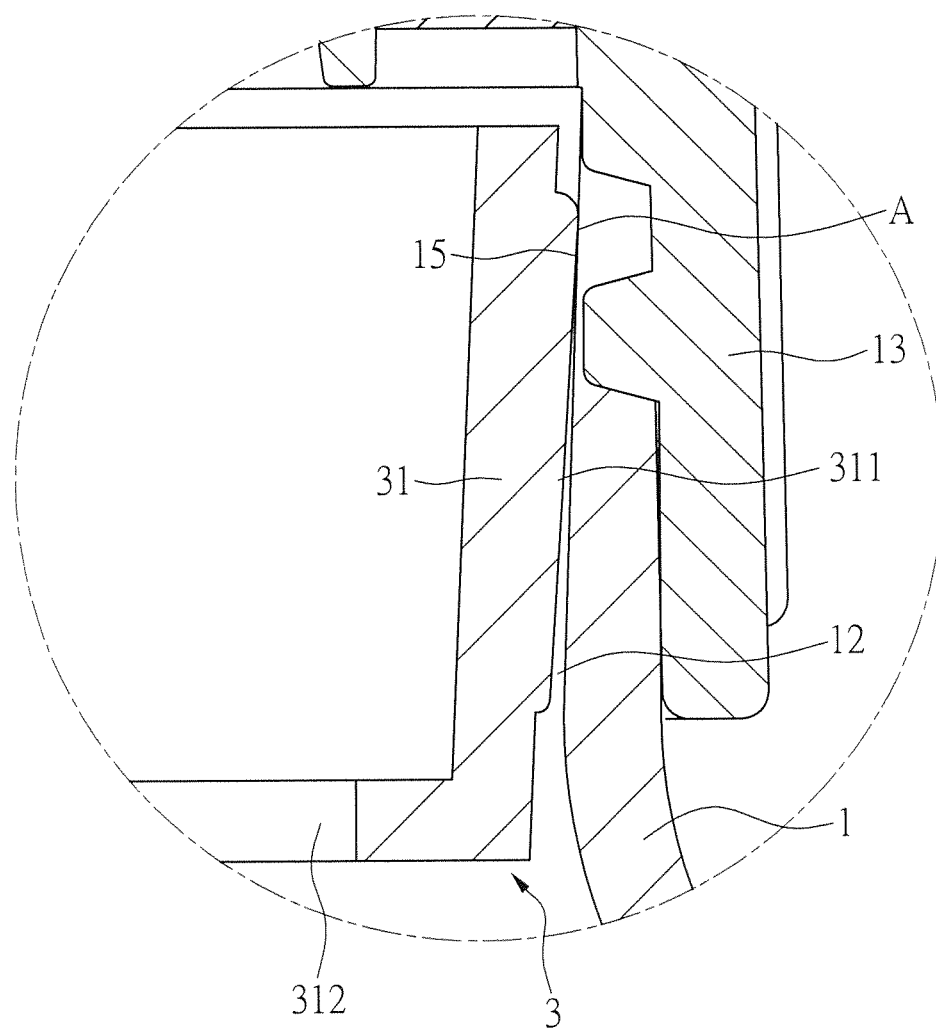
FIG. 6 is a partial enlarged view illustrating that an upper engaging part is positioned on an inside wall of an opening of a body by a protruding part thereof, in accordance with the present disclosure.

As shown in FIGS. 2, 5 and 6, the filter positioning structure of this embodiment is a casing member 3 having a one-piece structure. The casing member 3 includes an upper engaging part 31, a connecting part 32 and a lower engaging part 33. The upper engaging part 31 and the lower engaging part 33 are respectively connected with top and bottom ends of the connecting part 32, and the filter 2 is combined with the lower engaging part 33. The upper engaging part 31 is ring-shaped and has at least one protruding part located on an outer periphery thereof. In this embodiment, there are multiple protruding parts 311 arranged annularly on the outer periphery of the ring-shaped upper engaging part 31. An outer diameter of the protruding parts 311 formed at the most protruding parts A in lateral direction is ranged between the maximum diameter and minimum diameter of the opening 12. The upper engaging part 31 is positioned in the stop part by the plurality of protruding parts 311 thereof. In this embodiment, the upper engaging part 31 is positioned at the inside wall 15 of the opening 12 of the body 1.

Figure 7:
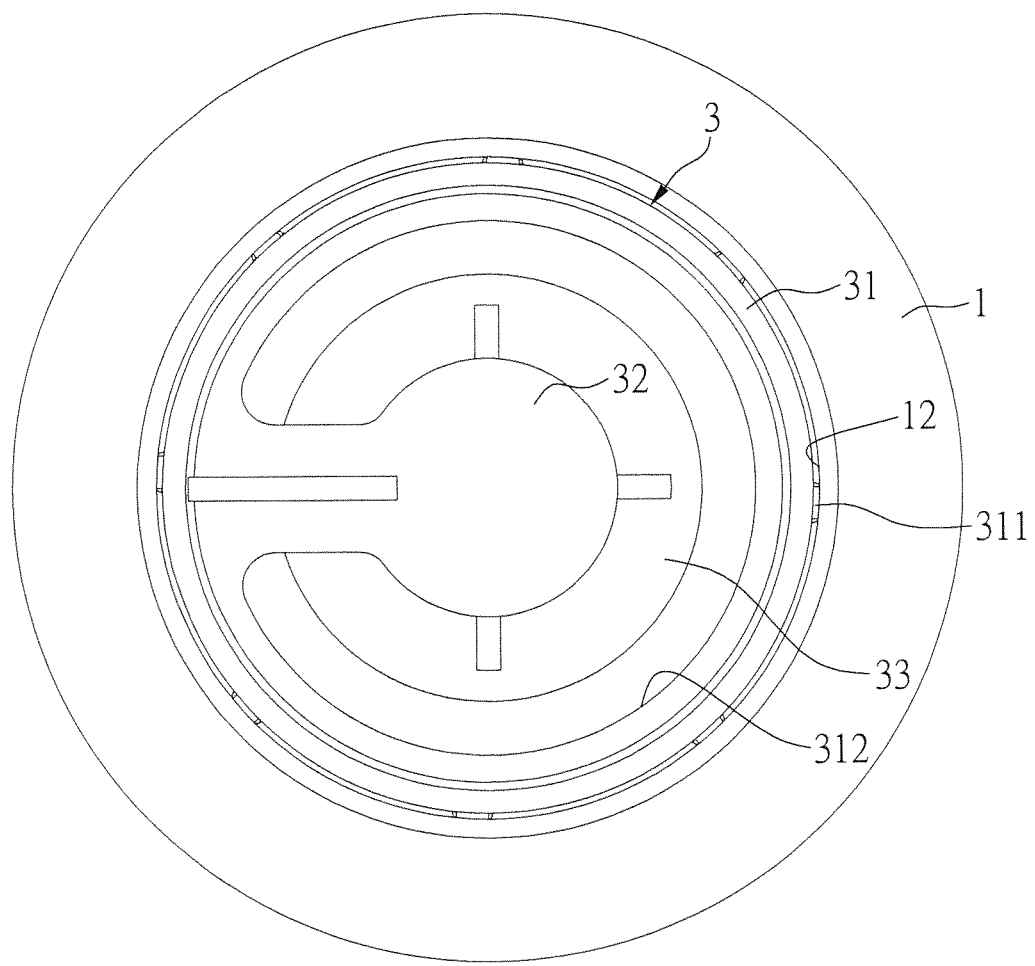
FIG. 7 is a plan view of the opening of the body of the present disclosure, illustrating that the upper engaging part is regularly positioned in the opening of the body by the plurality of protruding parts arranged annularly.
Figure 8:
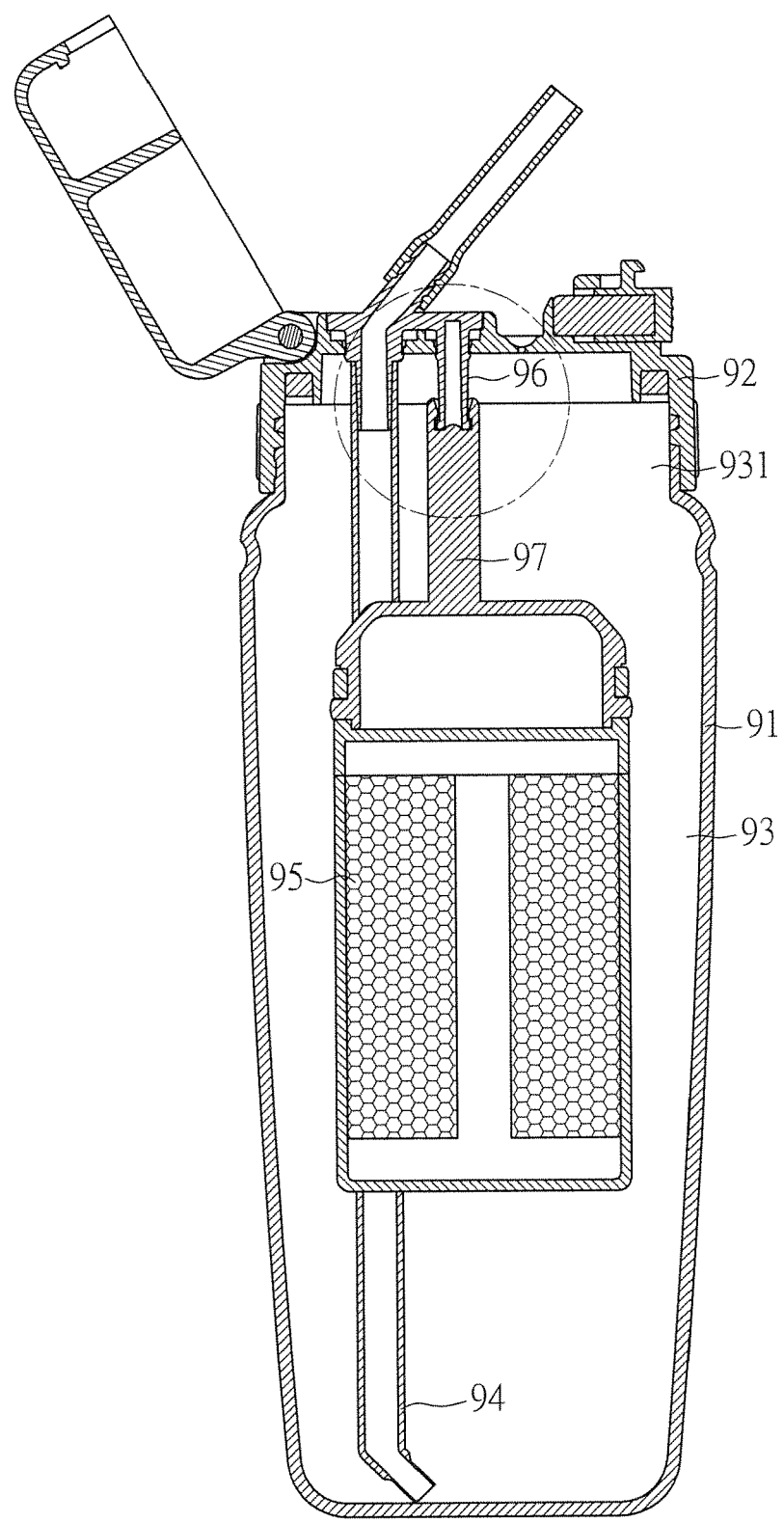
FIG. 8 is a sectional view of a structure of a conventional beverage infuser.
Figure 9:
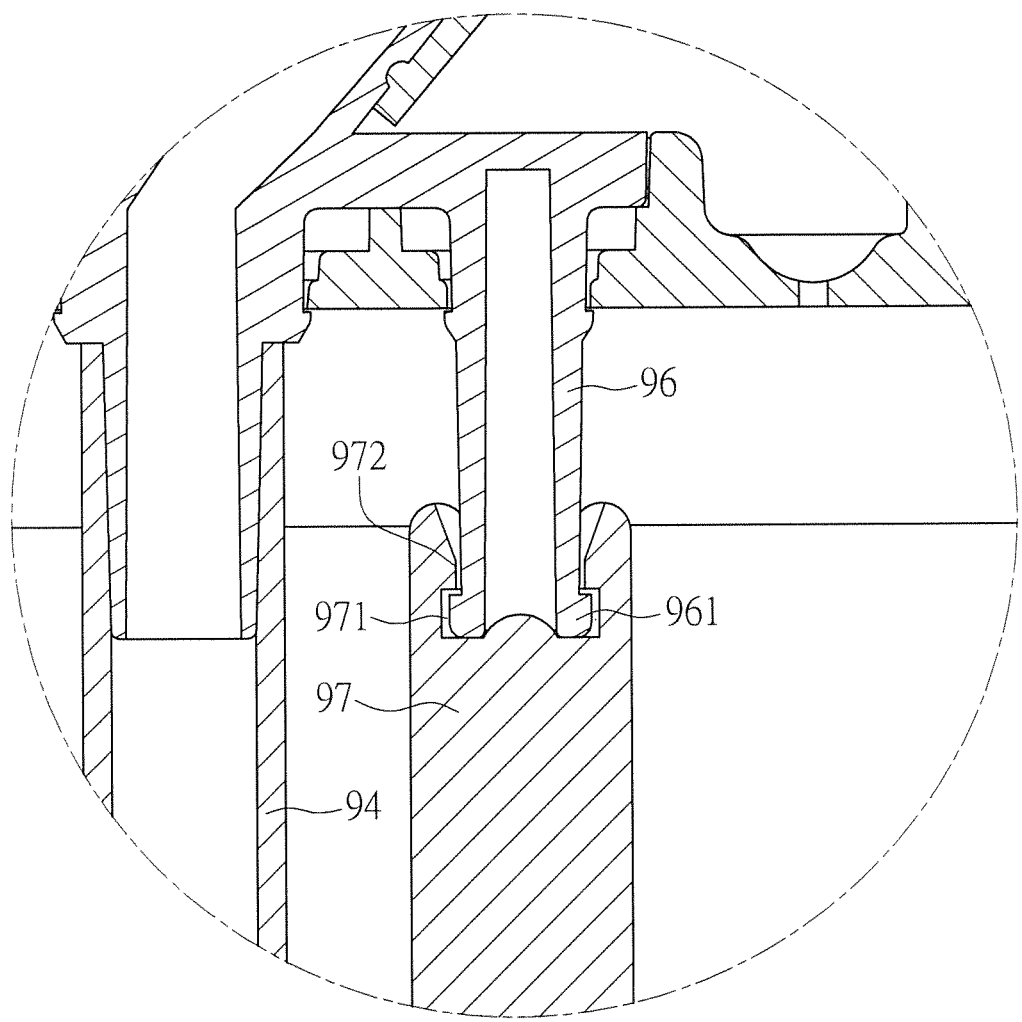
FIG. 9 is an enlarged view of a part of the FIG. 8, illustrating that a stop part of a cylinder is positioned in a cavity of a bar.

As shown in FIGS. 2 and 5, the connecting part 32 of this embodiment is column-shaped and has a bottom end directly connected with a central part of the lower engaging part 33. The upper engaging part 31 has a hollow bottom, and atop end of the connecting part 32 is located at the center of the hollow bottom of the upper engaging part 31 and connected with the upper engaging part 31 by only one side thereof via a bridging part 321. A hole 312 is formed by a hollow part of the hollow bottom of the upper engaging part 31 other than the bridging part 321. As shown in FIG. 7, the hole 312 is C-shaped in horizontal direction.

As shown in FIGS. 2, 3 and 5, an outer diameter of the connecting part 32 is smaller than the outer diameters of the upper and lower engaging parts 31 and 33, so that a longitudinal space 34 shrunk inwardly can be formed between the upper and lower engaging parts 31 and 33. In the chamber 11, the lower engaging part 33 is spaced apart from the inside wall 16 of the body 1 by a distance to form a channel 17, and the longitudinal space 34, the hole 312 and the channel 17 are in communication with each other in longitudinal direction.

In this embodiment, each of the protruding parts 311 has a protruding thickness thinned from top to bottom on the outer periphery of the upper engaging part 31. In addition, the column-shaped connecting part 32 includes plates 322 staggered horizontally and longitudinally, and the bridging part 321 has ribs 323 located at top and bottom sides thereof for connecting with the upper engaging part 31.

As described above, the opening 12 has a diameter gradually shrunk from top to bottom such that the inside wall 15 of the opening 12 of the body 1 forms a tapered hole with a wide top and a narrow bottom. In the upper engaging part 31, the outer diameter of the protruding parts 311 formed at the most protruding parts A in lateral direction is ranged between the maximum diameter and minimum diameter of the opening 12 (that is, between top and bottom boundaries of the tapered hole), so the most protruding parts A of the protruding parts 311 are stopped by the inside wall 15 of the opening 12 at a location between the maximum and minimum diameters of the opening 12. Therefore, the upper engaging part 31 can be positioned in the opening 12 of the body 1 by the protruding parts 311 thereof, and the problem that the upper engaging part 31 may be difficultly took off from the opening 12 because of the over-tight mounting between the outer periphery of the upper engaging part 31 and the inside wall 15 of the opening 12 can be prevented.

In this embodiment, the sucking pipe 14 is disposed at the bottom of the cover 13. The sucking pipe 14 is first inserted into the upper engaging part 31 through the hole 312 and then passed through the longitudinal space 34 and the channel 17, so that the sucking pipe 14 can be passed the casing member 3 and extended to the bottom of the chamber 11 unimpededly.

According to the above description, it is obvious that the present disclosure has following advantages.

1. The plurality of protruding part 311 is annularly arranged on the outer periphery of the upper engaging part 31 and the diameter of the opening 12 of the body 1 is gradually shrunk from top to bottom, so when the upper engaging part 31 is placed into the opening 12, the plurality of protruding parts 311 are regularly held in a certain location on the inside wall 15 of the opening 12 by the most protruding parts A, whereby the casing member 3 can be firmly positioned in the opening 12 of the body 1 by the upper engaging part 31. For taking off the casing member 3 from the opening 12, the user can just pull the upper engaging part 31 upwardly to separate from the opening 12. Obviously, assembly/disassembly of the casing member 3 on the body 1 is easy.

2. When the beverage infuser has the sucking pipe 14 connected with the cover 13 as shown in the embodiment, the casing member 3 has the hole 312 on the upper engaging part 31, and the longitudinal space 34 and the channel 17 are also respectively formed around the connecting part 32 and the lower engaging part 33, so the sucking pipe 14 can smoothly pass through the hole 312, the longitudinal space 34 and the channel 17 to extend into the chamber 11. Therefore, the casing member 3 located under the cover 13 does not affect the extension of the sucking pipe 14 into the chamber 11.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

The invention claimed is:

1. A filter positioning structure for a beverage infuser, comprising:

a container having a body formed with a chamber and an opening, and the body having a stop part located at the opening and a cover to cover the opening;

a casing member including an upper engaging part, a connecting part, and a lower engaging part, wherein the connecting part is column-shaped and has a top end and a bottom end, the upper engaging part is ring-shaped and connected to the top end of the connecting part through at least one bridging part, and at least one hole is formed between the upper engaging part and the top end of the connecting part; wherein the upper engaging part has a plurality of protruding parts located on an outer periphery thereof for engaging and being positioned within the stop part of the body, and the lower engaging part is connected to the bottom end of the connecting part; and a filter combined with the lower engaging part;

wherein an outer diameter of the connecting part is smaller than outer diameters of the upper and lower engaging parts to thereby form an inwardly-shrunk longitudinal space between the upper and lower engaging parts, and the lower engaging part being spaced with respect to the body by a distance in the chamber to form a channel whereby the longitudinal space, the hole, and the channel are in communication with each other; and wherein a diameter of the opening of the body gradually decreases towards the chamber to form the stop part, and the plurality of protruding parts being radially arranged in angularly-spaced relationship to together define an outer diameter of at least a longitudinal portion thereof between a minimum diameter and a maximum diameter of the opening, the upper engaging part thereby being positioned at an inside wall of the opening of the body.

2. The filter positioning structure according to claim 1, wherein a protruding thickness of each of the plurality of protruding parts gradually taper to mate with the opening of the body.

3. The filter positioning structure according to claim 1, wherein the casing member is a one-piece structure.

4. The filter positioning structure according to claim 1, wherein the column-shaped connecting part includes plates staggered horizontally and longitudinally, and ribs located at a top and a bottom of the bridging part and connected with the upper engaging part.

5. The filter positioning structure according to claim 1, wherein the bridging part is one in number, the connecting part is connected to the upper engaging part by the bridging part, and the hole is C-shaped.

* * * * *